(12) United States Patent
Sood et al.

(10) Patent No.: US 9,407,612 B2
(45) Date of Patent: Aug. 2, 2016

(54) TECHNOLOGIES FOR SECURE INTER-VIRTUAL NETWORK FUNCTION COMMUNICATION

(71) Applicants: Kapil Sood, Beaverton, OR (US); Jeffrey B. Shaw, Tempe, AZ (US); John R. Fastabend, Hillsboro, OR (US)

(72) Inventors: Kapil Sood, Beaverton, OR (US); Jeffrey B. Shaw, Tempe, AZ (US); John R. Fastabend, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/530,128

(22) Filed: Oct. 31, 2014

(65) Prior Publication Data
US 2016/0127333 A1    May 5, 2016

(51) Int. Cl.
*H04L 29/00* (2006.01)
*H04L 29/06* (2006.01)
*H04L 9/08* (2006.01)

(52) U.S. Cl.
CPC .............. *H04L 63/06* (2013.01); *H04L 9/0861* (2013.01); *H04L 63/0428* (2013.01); *H04L 63/20* (2013.01)

(58) Field of Classification Search
CPC ... G06F 9/455; G06F 2009/455; G06F 21/57; G06F 21/62; H04L 9/08; H04L 9/28; H04L 9/30; H04L 63/04; H04L 63/06; H04L 63/10
USPC ......... 380/255–30; 726/11–15; 713/150–154, 713/164–167
See application file for complete search history.

(56) References Cited

U.S. PATENT DOCUMENTS

| | | | |
|---|---|---|---|
| 7,853,782 B1 * | 12/2010 | Geddes | G06F 21/33 705/78 |
| 2010/0058051 A1 * | 3/2010 | Imai | G06F 9/45537 713/152 |
| 2011/0302415 A1 * | 12/2011 | Ahmad | G06F 21/57 713/168 |
| 2013/0085880 A1 * | 4/2013 | Roth | G06F 21/602 705/26.1 |
| 2014/0019745 A1 * | 1/2014 | Dodgson | H04L 63/065 713/150 |
| 2015/0180730 A1 * | 6/2015 | Felstaine | H04L 41/022 709/225 |

OTHER PUBLICATIONS

Riggio, Roberto, Tinku Rasheed, and Fabrizio Granelli. "Empower: A testbed for network function virtualization research and experimentation." Future Networks and Services (SDN4FNS), 2013 IEEE SDN for. IEEE, 2013.*

* cited by examiner

*Primary Examiner* — Madhuri Herzog
(74) *Attorney, Agent, or Firm* — Barnes & Thornburg LLP (57) ABSTRACT

Technologies for secure inter-virtual network function communication include a computing device to determine a cryptographic key for secure communication over at least one of an inter-virtual network function (VNF) network, an inter-virtual network function component (VNFC) network, or a VNF-VNFC network based on a security policy of the computing device; and. The computing device securely communicates over at least one of the inter-VNF, inter-VNFC, or VNF-VNFC network based on the determined cryptographic key.

25 Claims, 6 Drawing Sheets

FIG. 6 ated plat-US 9,407,612 B2

TECHNOLOGIES FOR SECURE INTER-VIRTUAL NETWORK FUNCTION COMMUNICATION

BACKGROUND

Various technical specifications define the way in which network functions and services are deployed and managed by network operators and service providers worldwide. For example, specifications define the use of virtualized platforms to deliver services and, oftentimes, components within a service may be "chained" together. Such technical specifications include, for example, the European Telecommunication Standards Institute's standard for Network Functions Virtualization (ETSI NFV). In some circumstances, operators may require the ability to run various network functions in an unmodified manner. In a virtualized environment, doing so may entail allowing network function vendors to run existing workloads on a virtualized platform, which often translates into security requirements that all inter-platform communications are untrusted (e.g., in distributed deployments implementations). However, executing sensitive inter-virtual network function (VNF) and inter-VNF component (VNFC) communication over unprotected networks may lead to unauthorized data snooping, data alteration, data duplication, network routing, privacy breaches, and/or other security concerns.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C): (A and B); (B and C); (A and C); or (A, B, and C). Similarly, items listed in the form of "at least one of A, B, or C" can mean (A); (B); (C): (A and B); (B and C); (A and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Figure 1:
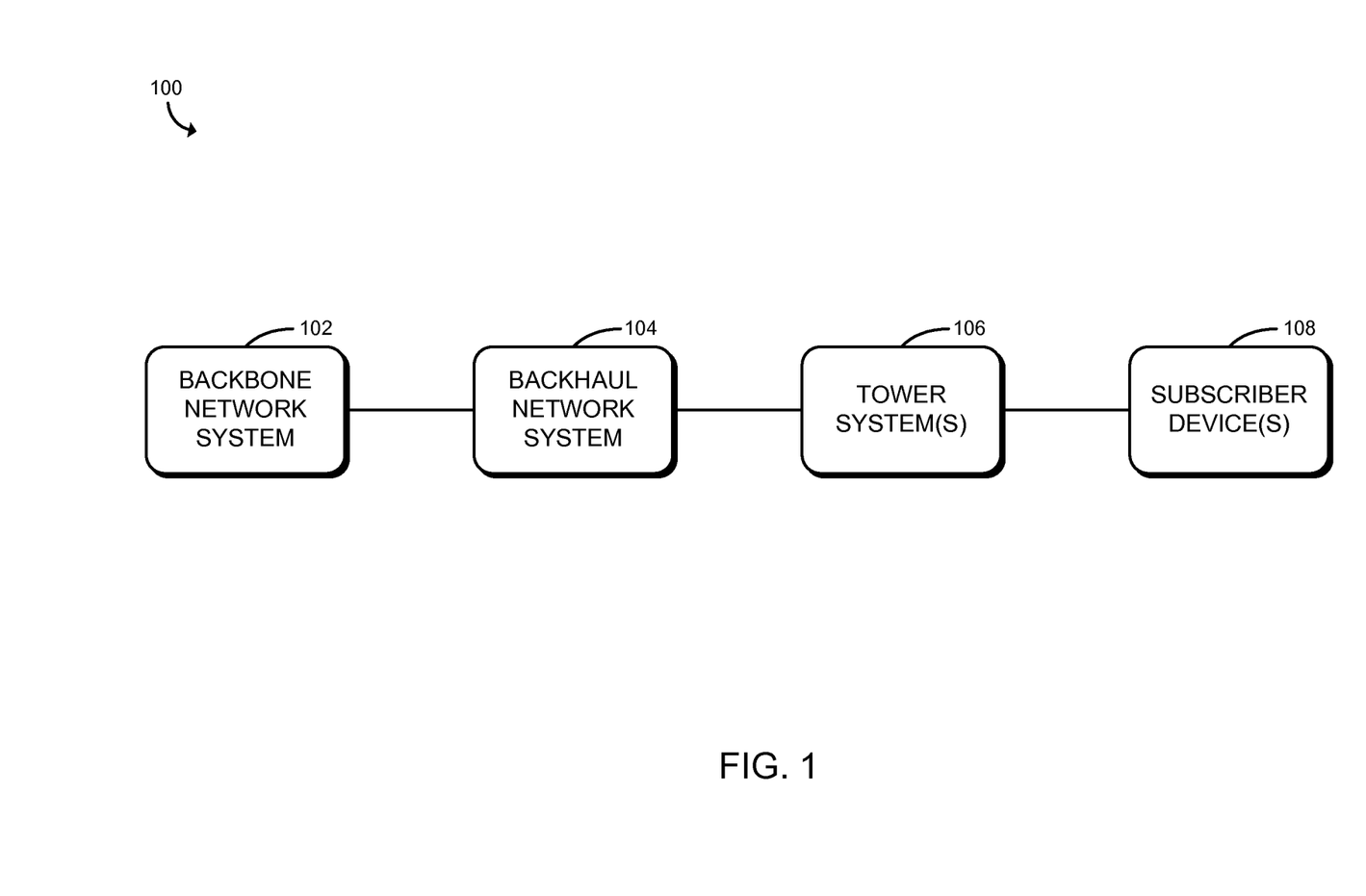
FIG. 1 is a simplified block diagram of at least one embodiment of a system for secure inter-virtual network function communication.

Referring now to FIG. 1, a system 100 for secure inter-virtual network function communication illustratively includes a backbone network system 102, a backhaul network system 104, one or more tower systems 106, and one or more subscriber devices 108. In the illustrative embodiment, the subscriber devices 108 communicate with the backhaul network system 104 by virtue of the tower systems 106, and the backhaul network system 104 ensures the appropriate data packets are routed to the backbone network system 102 for processing and/or further routing. It should be appreciated that each of the backbone network system 102, the backhaul network system 104, the tower systems 106, and the subscriber devices 108 may be embodied as any suitable device or collection of devices for performing the functions described herein. In the illustrative embodiment, each of the backbone network system 102, the backhaul network system 104, and the tower systems 106 enable telecommunication between the subscriber devices 108 and/or other devices (e.g., over the Internet). Further the backbone network system 102, the backhaul network system 104, and the tower systems 106 may include any number of devices, networks, routers, switches, computers, and/or other intervening devices to facilitate their corresponding functions depending on the particular implementation.

In some embodiments, the backbone network system 102 may be embodied as a Network Function Virtualization (NFV)-based Long-Term Evolution (LTE) backbone network having a Virtual Evolved Packet Core (vEPC) architecture. It should be appreciated that the backbone network system 102 may serve as a centralized network and, in some embodiments, may be communicatively coupled to another network (e.g., the Internet). In the illustrative embodiment, the backhaul network system 104 includes one or more devices that communicatively couple (e.g., via intermediate links) the backbone network system 102 to the tower systems 106, subnetworks, and/or edge networks. In some embodiments, the backhaul network system 104 may be embodied as an LTE backhaul network system and may include a variety of networks including, for example, T1, IP, optical, ATM, leased, and/or other networks.

The tower systems 106 include hardware configured to permit communication devices, for example, mobile computing devices (e.g., mobile phones) and/or other subscriber devices 108, to communicate with one another and/or other remote devices. In doing so, the tower systems 106 enable the subscriber devices 108 to communicate with the backhaul network system 104. In some embodiments, one or more of tower systems 106 may include or otherwise be embodied as an evolved node (eNodeB) configured to communicate directly or indirectly with one or more of the subscriber devices 108 (e.g., mobile computing device handsets). Further, the tower systems 106 may include or serve as, for example, a base transceiver station (BTS) or another station/system depending on the particular embodiment. The subscriber devices 108 may be embodied as any type of computing device capable of performing the functions described herein. For example, in embodiments in which an LTE backhaul and backbone system are utilized, the subscriber devices 108 may be embodied as mobile computing devices (e.g., smartphones) and may be configured to utilize a cellular network.

As described in detail below, the system 100 or, more particularly, the system 102 may utilize various virtual network functions while ensuring that the inter-VNF and inter-VNFC communications (e.g., VNF-VNF communications, VNFC-VNFC communications, and/or VNF-VNFC communications) are protected. Further, in some embodiments, the system 100 permits such communications without requiring vendors to modify their VNFs and therefore avoiding potentially unwieldy deployment scenarios.

Figure 2:
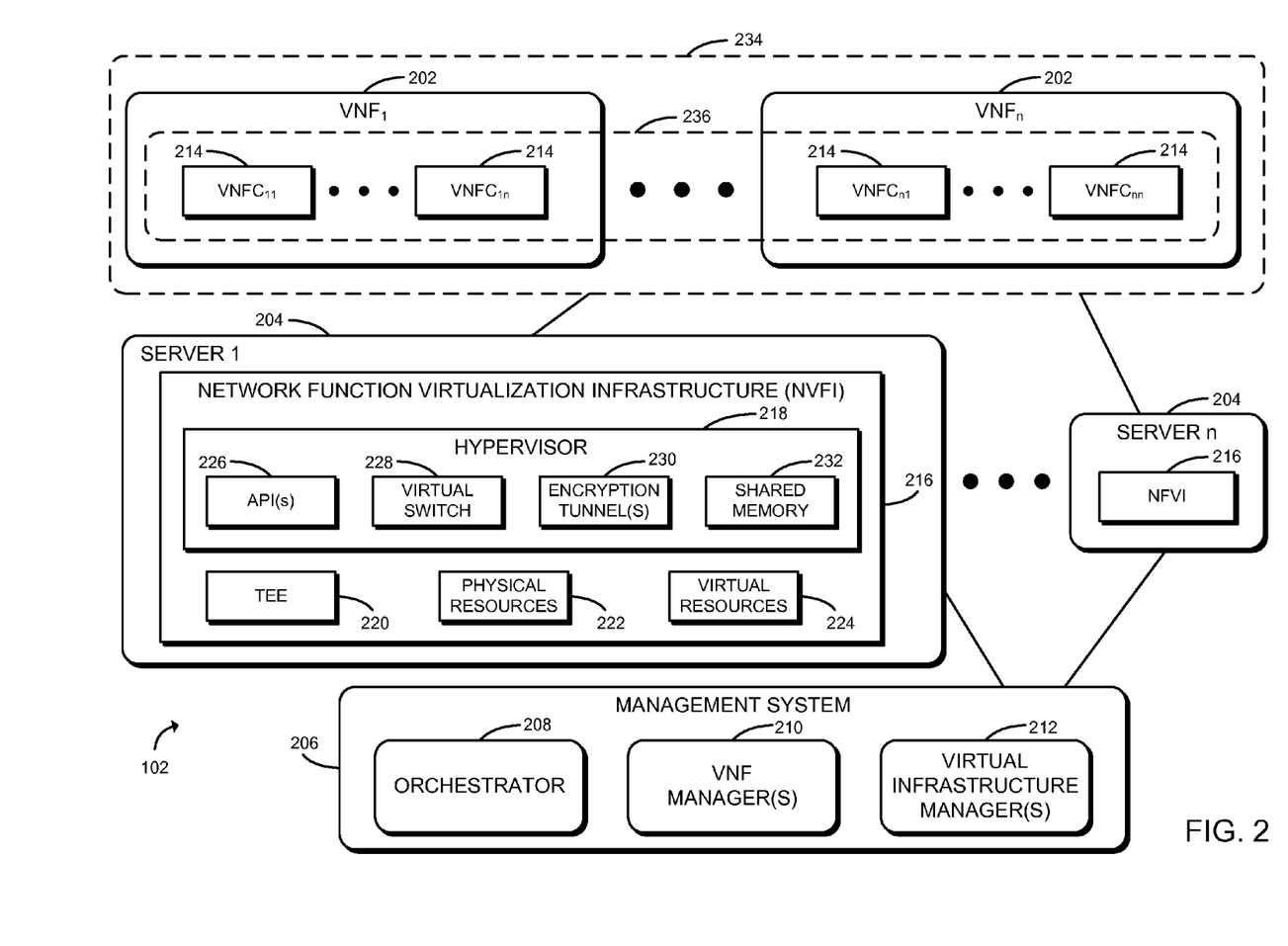
FIG. 2 is a simplified block diagram of at least one embodiment of a backbone network system of the system of FIG. 1.

Referring now to FIG. 2, in the illustrative embodiment, the backbone network system 102 includes one or more VNFs 202, one or more servers 204, and a management system 206. Additionally, in the illustrative embodiment, the management system 206 includes an orchestrator 208, one or more VNF managers 210, and one or more virtual infrastructure managers (VIMs) 212. Although the orchestrator 208, the VNF managers 210, and the VIMs 212 are shown as independent devices or components in the illustrative embodiment, it should be appreciated that the orchestrator 208, the VNF managers 210, and/or the VIMs 212 may be embodied on the same or different devices (e.g., one or more servers) in other embodiments. Further, in some embodiments, the system 102 may be embodied as a system different from the backbone network system 102 of FIG. 1. It should further be appreciated that, in some embodiments, each of the servers 204 may include similar hardware, software, and/or firmware components.

Figure 3:
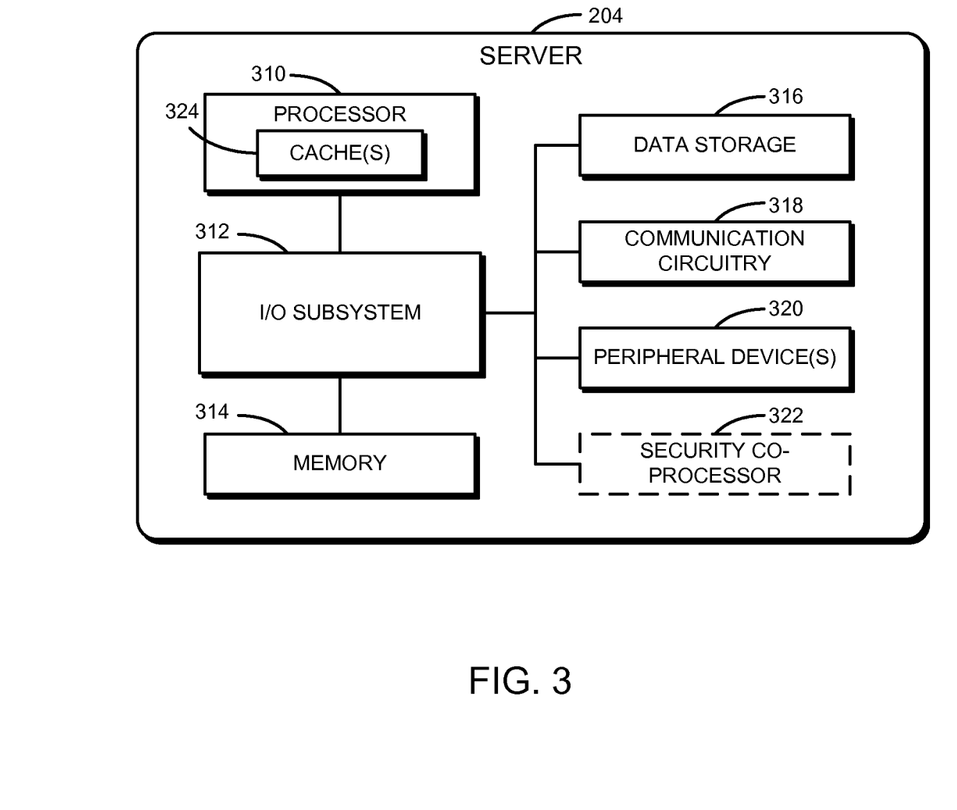
FIG. 3 is a simplified block diagram of at least one embodiment of a server of the backbone network system of FIG. 2.

Referring now to FIG. 3, an illustrative embodiment of the servers 204 of the system 102 is shown. As shown, the illustrative server 204 includes a processor 310, an input/output ("I/O" subsystem) 312, a memory 314, a data storage 316, a communication circuitry 318, and one or more peripheral devices 320. Additionally, in some embodiments, the server 204 may include a security co-processor 322. Of course, the server 204 may include other or additional components, such as those commonly found in a typical computing device (e.g., various input/output devices and/or other components), in other embodiments. Additionally, in some embodiments, one or more of the illustrative components may be incorporated in, or otherwise form a portion of, another component. For example, the memory 314, or portions thereof, may be incorporated in the processor 310 in some embodiments.

The processor 310 may be embodied as any type of processor capable of performing the functions described herein. For example, the processor 310 may be embodied as a single or multi-core processor(s), digital signal processor, microcontroller, or other processor or processing/controlling circuit. As shown, the processor 310 may include one or more cache memories 324. It should be appreciated that the memory 314 may be embodied as any type of volatile or non-volatile memory or data storage capable of performing the functions described herein. In operation, the memory 314 may store various data and software used during operation of the server 204 such as operating systems, applications, programs, libraries, and drivers. The memory 314 is communicatively coupled to the processor 310 via the I/O subsystem 312, which may be embodied as circuitry and/or components to facilitate input/output operations with the processor 310, the memory 314, and other components of the server 204. For example, the I/O subsystem 312 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 312 may form a portion of a system-on-a-chip (SoC) and be incorporated, along with the processor 310, the memory 314, and other components of the server 204, on a single integrated circuit chip.

The data storage 316 may be embodied as any type of device or devices configured for short-term or long-term storage of data such as, for example, memory devices and circuits, memory cards, hard disk drives, solid-state drives, or other data storage devices. The data storage 316 and/or the memory 314 may store various data during operation of the server 204 useful for performing the functions described herein.

The communication circuitry 318 may be embodied as any communication circuit, device, or collection thereof, capable of enabling communications between the server 204 and other remote devices over a network. The communication circuitry 318 may be configured to use any one or more communication technologies (e.g., wireless or wired communications) and associated protocols (e.g., Ethernet, Bluetooth®, Wi-Fi®, WiMAX, etc.) to effect such communication. In some embodiments, the communication circuitry 318 includes cellular communication circuitry and/or other long-ranged wireless communication circuitry. Further, in some embodiments, the communication circuitry 318 includes a physical network switch such as a network interface card (NIC) that is configured to communicate with remote devices (e.g., other servers 204).

The peripheral devices 320 may include any number of additional peripheral or interface devices, such as speakers, microphones, additional storage devices, and so forth. The particular devices included in the peripheral devices 320 may depend on, for example, the type and/or intended use of the server 204.

The security co-processor 322, if included, may be embodied as any hardware component(s) or circuitry capable of performing security functions, cryptographic functions, and/or establishing a trusted execution environment. For example, in some embodiments, the security co-processor 322 may be embodied as a trusted platform module (TPM) or an out-of-band processor. Additionally, in some embodiments, the security co-processor 322 may establish an out-of-band communication link with remote devices (e.g., corresponding security co-processors 322 of other servers 204).

Referring back to FIG. 2, as shown, the system 102 includes one or more virtual network functions (VNFs) 202, each of which may include one or more virtual network function components (VNFCs) 214. It should be appreciated that the VNFs 202 may be embodied as any suitable virtual network functions; similarly, the VNFCs 214 may be embodied as any suitable VNF components. For example, in some embodiments, the VNFs 202 may include a security gateway (SGW), a packet data network gateway (PNG), a billing function, and/or other virtual network functions. In some embodiments, a particular VNF 202 may have multiple sub-instances, which could be executing on the same server 204 or different servers 204. In other words, when virtualized, network functions traditionally handled by physical hardware co-located with a particular server 204 may be distributed as VNFs 202 across one or more of the servers 204. In the illustrative embodiment, the VNFCs 214 are processes and/or instances that cooperate to deliver the functionality of one or more VNFs 202. For example, in some embodiments, the VNFCs 214 are sub-modules of the VNFs 202. Similar to the VNFs 202, it should be appreciated that the VNFCs 214 may be distributed across one or more servers 204. Further, it should be appreciated that a particular VNFC 214 may be distributed across multiple servers 204 and still form a part of a VNF 202 established on a single server 204. In particular, in some embodiments, the VNFs 202 and/or the VNFCs 214 may be executing on the same server 204. In other embodiments, the VNFs 202 and/or the VNFCs 214 may be executing within the same data center but on different servers 204. In yet other embodiments, the VNFs 202 and/or the VNFCs 214 may be executing across different data centers.

As described herein, in the illustrative embodiment, the VNFs 202 of one or more servers 204 may communicate with one another, for example, over an inter-VNF communication network 234 via one or more inter-VNF (VNF-VNF) communication mechanisms. Similarly, the VNFCs 214 of one or more servers 204 may communicate with one another, for example, over an inter-VNFC (VNFC-VNFC) communication network 236 via one or more inter-VNFC communication mechanisms. Additionally, in some embodiments, a VNF 202 of one or more servers 204 may communicate with a VNFC 214 of one or more servers 204 over a VNF-VNFC communication network (not shown) via one or more VNF-VNFC communication mechanisms. It should be appreciated that the VNF-VNF, VNFC-VNFC, and VNF-VNFC communication mechanisms may be embodied as any suitable mechanisms configured to enable such communication. For example, in some embodiments, the VNFs 202 and/or VNFCs 214 may communicate with one another using an open switch with a hypervisor and packet parsing, formatted packets based on a standard format, shared memory (e.g., physical/virtual memory reserved by the hypervisor), over a physical network switch, and/or other suitable mechanisms.

In the illustrative embodiment of FIG. 2, each of the servers 204 includes a network function virtualization infrastructure (NFVI) 216, which includes a hypervisor 218, a trusted execution environment (TEE) 220, physical resources 222, and virtual resources 224. Additionally, the hypervisor 218 includes one or more APIs 226, a virtual switch (vSwitch) 228, one or more encryption tunnels 230, and a shared memory 232. Of course, the servers 204 may include additional components in some embodiments, which are omitted for clarity of the description. As described below, in the illustrative embodiment, the corresponding network function virtualization infrastructure (NFVI) 216 of the servers 204 ensure that the VNF-VNF, VNFC-VNFC, and VNF-VNFC communication is secure.

The hypervisor 218 or virtual machine monitor runs one or more virtual machines (VMs) on the corresponding server 204. As such, the hypervisor 218 may establish and/or utilize various virtualized hardware resources (e.g., virtual memory, virtual operating systems, virtual networking components, etc.). The particular APIs 226 included in the hypervisor 218 and/or the server 204 generally may vary depending on the particular server 204. In some embodiments, the APIs 226 include one or more proprietary APIs. In some embodiments, the APIs 226 may provide access to packets (e.g., associated with a particular VNF 202) by the TEE 220. The virtual switch 228 may be utilized to enforce network policies and/or enforce actions (e.g., drop packets, monitor flows, perform deep inspection, perform remediation actions, etc.). For example, the virtual switch 228 may permit the networking of virtual machines (VMs) in the system 102. In some embodiments, the session keys and/or other cryptographic keys may be utilized by the virtual switch 228 to ensure that VNF-VNF, VNFC-VNFC, and/or VNF-VNFC communications are secure. As described below, in some embodiments, the server 204 may establish encryption tunnels 230 for secure communication (e.g., for VNF-VNF, VNFC-VNFC, and/or VNF-VNFC communication). In some embodiments, the NFVI 216 may utilize fuse keys and/or other cryptographic keys that establish a root of trust to establish the encryption tunnels 230. Additionally, in some embodiments, one or more VMs, VNFs 202, and/or VNFCs 214 may utilize the shared memory 232. For example, in some embodiments, the VNFs 202 and VNFCs 214 may utilize the shared memory 232 to communicate with one another. It should be appreciated that the shared memory 232 may include physical memory and/or virtual memory depending on the particular embodiment.

As described above, the NFVI 216 also includes the TEE 220, the physical resources 222, and the virtual resources 224. In the illustrative embodiment, the TEE 220 is established as a secure enclave such as Intel® Software Guard Extensions (SGX). However, in other embodiments, the TEE 220 may be otherwise established, for example, as a Manageability Engine (ME), trusted platform module (TPM), Innovation Engine (IE), secure partition, separate processor core, and/or otherwise established. For example, in some embodiments, the TEE 220 may be embodied as or established by virtue of the security co-processor 322. As discussed herein, the TEE 220 is configured to perform various key management functions, cryptographic functions, and/or other security functions for the NFVI 216 to ensure that the VNF-VNF, VNFC-VNFC, and VNF-VNFC communication is protected. For example, the TEE 220 may establish cryptographic keys (e.g., base and/or session keys) for various communicating entities (e.g., VNFs and VNFCs) in response to instantiation of the entities. In some embodiments, the session keys may be dynamically updated based on, for example, the particular VNFs 202 and VNFCs 214 discovered by the corresponding server 204 at a given time. It should be appreciated that, in the illustrative embodiment, the TEEs 220 may communicate with one another over an out-of-band communication network.

The physical resources 222 and the virtual resources 224 may be embodied as any physical and virtual resources suitable for performing the functions described herein. In the illustrative embodiment, the physical resources 222 include computing hardware, storage hardware, and network hardware; similarly, the virtual resources 224 include virtual computing resources, virtual storage, and virtual networking resources. For example, in some embodiments, the physical resources 222 may include memory (e.g., volatile and/or non-volatile memory or data storage), cache, engines (e.g., a SoC, graphics engine, security engine, audio engine, cryptographic module, TPM, co-processor, communication link or channel, switch, and/or another engine configured to process or otherwise handle data), and/or network interfaces (e.g., a NIC). Further, in some embodiments, the virtual resources 224 may include software-defined storage, a software-defined networking module, and/or other software-defined resources.

As discussed above, the management system 206 includes an orchestrator 208, one or more VNF managers 210, and one or more VIMs 212. In the illustrative embodiment, the NFVI 216 may utilize VNF discovery mechanisms to monitor orchestrator 208 and/or VNF manager 210 messaging. As such, when a particular VNF 202 or VNFC 214 is instantiated, the NFVI 216 discovers the instantiated entity. The VNF managers 210 are responsible for managing scaling and deployment. For example, the VNF managers 210 may instruct various servers 204 to instantiate particular VNFs 202 and/or VNFCs 214. In doing so, the VNF managers 210 may consult with the VIMs 212, which identify the particular servers 204 available for deployment of VNFs 202 and/or VNFCs 214. It should be appreciated that the VIMs 212 may make such a determination using any suitable techniques, algorithms, and/or mechanisms. In some embodiments, the orchestrator 208 instructs the VIM 212 of the type of protection desired for an entity and therefore the associated service chain, and the VIM 212 ensures that those service chains are established. In the illustrative embodiment, the corresponding VNFs 202 and VNFCs 214 communicate with each other to create the relevant service function chains and transmit network packets (e.g., TCP/IP packets, IP route updates, control traffic, 802.11-based packets, LTE/3G stack, legacy packets, etc.) to one another. In some embodiments, the VNFs 202 and/or the VNFCs 214 may discover on another through service discovery protocols, DNS, and/or other discovery mechanisms.

Additionally, in the illustrative embodiment, the management system 206 transmits a security policy 408 to the servers 204 (e.g., to which entities are deployed) associated with the deployed VNFs 202 and/or VNFCs 214. The security policy 408 may indicate, for example, the circumstances and/or procedure by which the VNF-VNF, VNFC-VNFC, and/or VNF-VNFC communication should be protected. For example, in some embodiments, the security policy 408 may indicate that it is unnecessary for the NFVI 216 to encrypt communication between VNFs 202 and/or VNFCs 214 that is constrained within a single server 204 but that other communication should be encrypted. In such embodiments, the security policy 408 may consider the protection afforded by the hypervisor 218 to be sufficient protection. In other embodiments, the security policy 408 may indicate that all VNF-VNF, VNFC-VNFC, and VNF-VNFC communication should be protected regardless of the source and destination servers 204. Additionally, in some embodiments, the security policy 408 identifies the process/traffic flow of one or more packets based on the determined service chain. It should further be appreciated that, in some embodiments, the management system 206 may ensure that regulatory requirements (e.g., regulatory-specific cryptographic algorithms, key sizes, block sizes, unidirectional or bidirectional traffic protection, etc.) associated with VNF-VNF, VNFC-VNFC, and VNF-VNFC communication are satisfied (e.g., by incorporation into the security policy 408).

The orchestrator 208, the VNF managers 210, and the VIMs 212 may be embodied as any server or computing device capable of performing the functions described herein. Further, the orchestrator 208, the VNF managers 210, and the VIMs 212 may include components similar to the components of the servers 204 described above and/or components commonly found in a server such as a processor, memory, I/O subsystem, data storage, peripheral devices, and so forth, which are not illustrated in FIG. 2 for clarity of the description.

Figure 4:
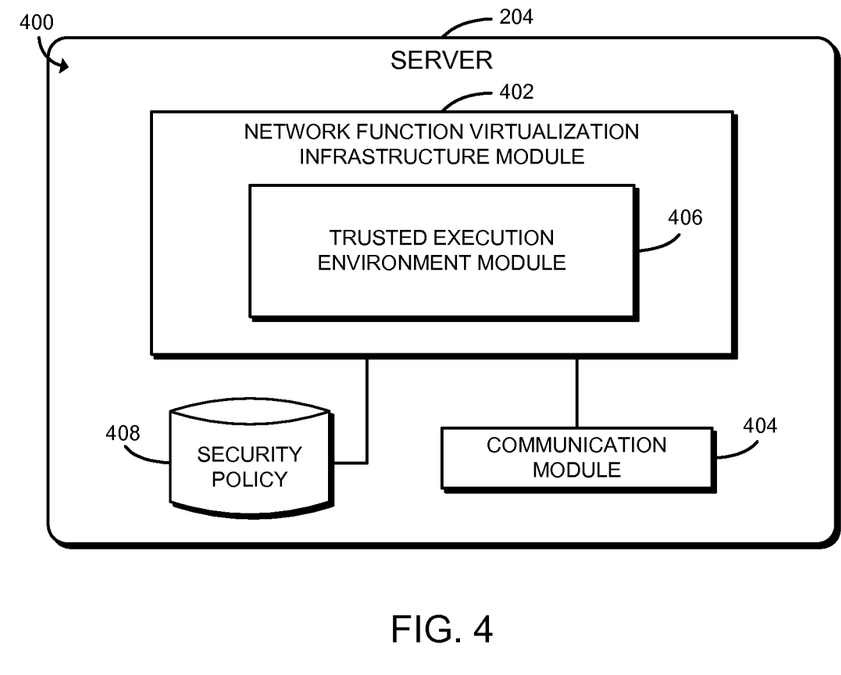
FIG. 4 is a simplified block diagram of at least one embodiment of an environment of the server of FIG. 3.

Referring now to FIG. 4, in use, one or more of the servers 204 establishes an environment 400 for secure inter-virtual network function communication or, more specifically, for secure VNF-VNF, VNFC-VNFC, and/or VNF-VNFC communication. The illustrative environment 400 includes a network function virtualization infrastructure (NFVI) module 402 and a communication module 404. Additionally, the NFVI module 402 includes a trusted execution environment module 406. Each of the modules of the environment 400 may be embodied as hardware, software, firmware, or a combination thereof. Additionally, in some embodiments, one or more of the illustrative modules may form a portion of another module and/or one or more of the illustrative modules may be embodied as a standalone or independent module. For example, each of the modules, logic, and other components of the environment 400 may form a portion of, or otherwise be established by, the processor 310 of the server 204.

The NFVI module 402 is configured to perform various key management functions, cryptographic functions, secure communication channel management, and/or other security functions to ensure that the VNF-VNF, VNFC-VNFC, and VNF-VNFC communication is protected to the extent required by the relevant security policy 408. It should be appreciated that, in some embodiments, protecting the VNF and VNFC communications (e.g., via encrypted communications or an otherwise secure communication channel) permits the VNFs 202 and VNFCs 214 to be run unmodified across various topologies (i.e., the particular topologies may be arbitrarily chosen). Further, as described below, the NFVI module 402 may perform key management transparently to the VNFs 202 and/or VNFCs 214 (e.g., without exposing keys and/or key management metadata outside the NFVI module 402). Additionally, the NFVI module 402 may utilize fuse/root keys (e.g., established by OEM or component manufacturer) as foundational cryptographic keys for establishing secure communication channels between the trusted execution environment module 406 and a corresponding trusted execution environment module 406 of another server 204. Further, as described below, in some embodiments, the NFVI module 402 may dynamically establish and/or update secure sessions between VNFs 202 and/or VNFCs 214, prevent communications to occur prior to establishing security (e.g., via encryption keys and/or tunnels) between entities (e.g., VNFs 202 and/or VNFCs 214), enforce security processing of communication traffic (e.g., all traffic) between VNFs 202 (e.g., VNF-VNF, VNFC-VNFC, and/or VNF-VNFC traffic), permit only VNFs 202 and/or VNFCs 214 with established security policies 408 communicate with one another, and/or perform security processing at various granularity (e.g., all traffic, management and/or control traffic, per packet, per flow, per policy headers on the corresponding packet, etc.). It should be appreciated that, in some embodiments, each VNF 202, VNFC 214, process flow, and/or communicative entity pairing (e.g., particular VNF 202 and other VNF 202) may have a separate cryptographic key (or set of cryptographic keys) for secure communication and may also have a separate security policy 408. The security policy 408 may identify, for example, the key lifetimes/expiration dates, whether the keys can persist (e.g., in storage), key renewal requirements, and/or other parameters associated with the cryptographic keys utilized by the NFVI module 402.

The trusted execution environment (TEE) module 406 of the NFVI module 402 establishes a trusted execution environment (e.g., the TEE 220) or otherwise secure environment within the server 204 and performs various cryptographic functions for secure communication between VNFs 202 and VNFCs 214 of the server 204 and other VNFs 202 and VNFCs 214 (e.g., instantiated on the same server 204 or a remote server 204). Depending on the particular embodiment, the TEE module 406 may handle the generation and verification of cryptographic keys, signatures, hashes, and/or perform other cryptographic functions. In some embodiments, the TEE 220 may establish a trusted relationship with a corresponding TEE 220 of another server 204. For example, in doing so, the TEEs 220 may perform a cryptographic key exchange. In some embodiments, the TEEs 220 may communicate with one another over established encrypted and/or otherwise secure tunnels. As described above, in some embodiments, the TEEs 220 may communicate with one another over an out-of-band communication channel (i.e., a communication channel separate from a common communication channel between the corresponding servers 204). In some embodiments, the TEE module 406 (e.g., the TEE 220) detects the instantiation of a new VNF 202 or VNFC 214 and generates the corresponding cryptographic keys as described herein. It should be appreciated that such detection may occur through any suitable algorithms, techniques, and/or mechanisms. For example, in some embodiments, the TEE module 406 may detect the instantiation of a VNF 202 or VNFC 214 through drivers established between the hypervisor 218 and the TEE 220 (e.g., HECI), by virtue of signals transmitted from the VNF manager 210 to the NFVI 216 though a control and management communication channel (e.g., through the VIM 212), and/or by virtue of REST APIs (e.g., using JSON data formats).

The communication module 404 handles the communication between the server 204 and remote devices (e.g., other servers 204) through a suitable network. For example, as discussed above, the TEEs 220 of two servers 204 may communicate with one another over an out-of-band communication channel or via encrypted tunnels.

Figure 5:
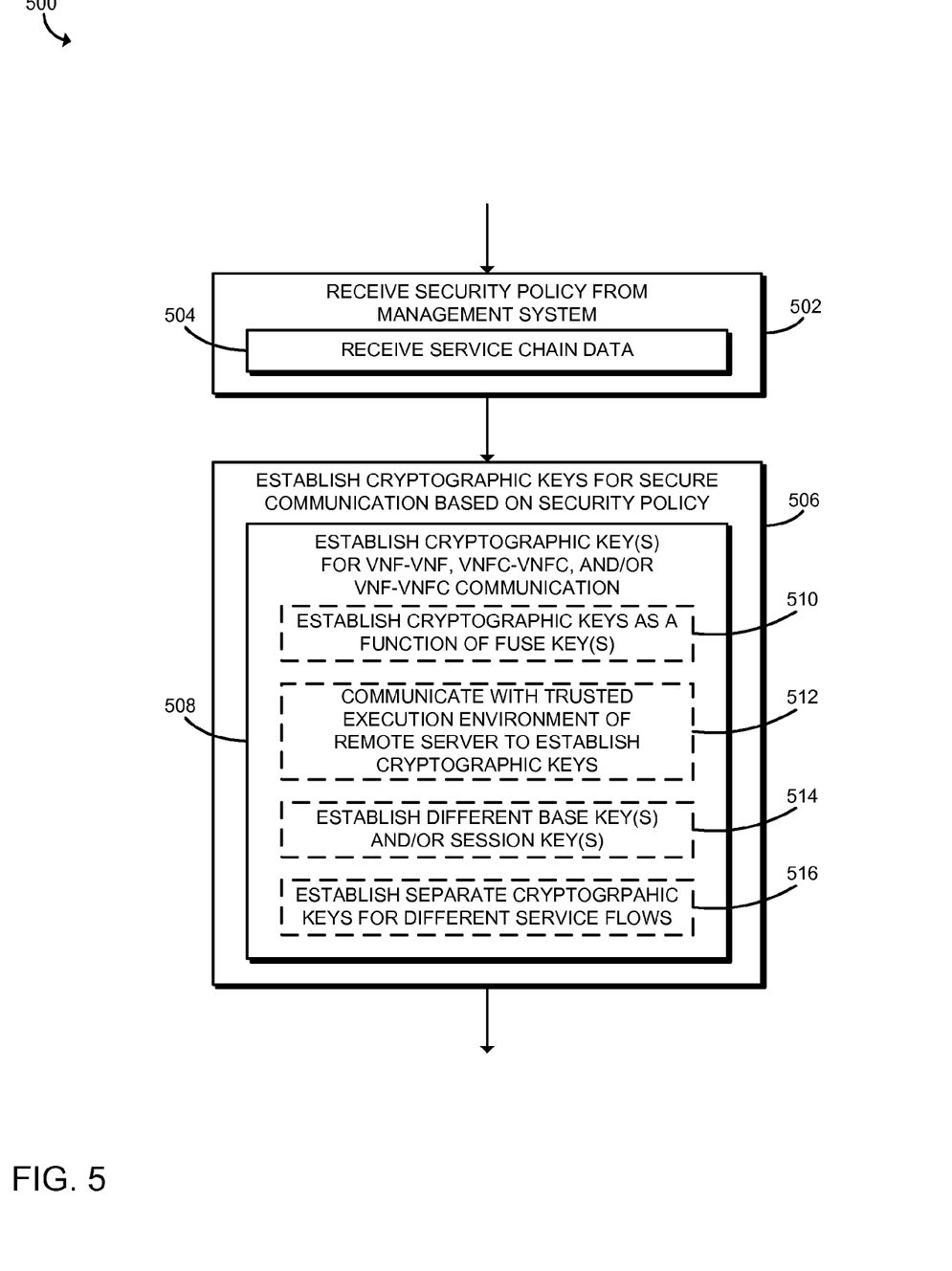
FIG. 5 is a simplified flow diagram of at least one embodiment of a method for establishing cryptographic keys for secure inter-virtual network function communication that may be executed by the server of FIG. 3.

Referring now to FIG. 5, in use, the server 204 may execute a method 500 for establishing cryptographic keys for secure inter-virtual network function communication or, more specifically, for establishing cryptographic keys for secure VNF-VNF, VNFC-VNFC, and/or VNF-VNFC communication. It should be appreciated that, in some embodiments, the server 204 executes the method 500 with the NFVI module 402 (e.g., the NVFI 216). The illustrative method 500 begins with block 502 in which the server 204 receives a security policy 408 from the management system 206. In doing so, in block 504, the server 204 may receive service chain data from the management system 206. For example, as discussed above, the security policy 408 may identify the process/traffic flow of one or more packets based on the determined service chain for one or more VNFs 202 and/or VNFCs 214 to be instantiated on the server 204. Additionally, the security policy 408 may identify the particular security required for the VNF-VNF, VNFC-VNFC, and/or VNF-VNFC communication corresponding with VNFs 202 and/or VNFCs 214 to be instantiated or established on the server 204. It should further be appreciated that, in some embodiments, each of the VNFs 202 and/or VNFCs 214 may have its own security policy 408. In other embodiments, such security policies 408 may have even finer granularity (e.g., associated with particular flows, packets, etc.).

In block 506, the server 204 establishes cryptographic keys for secure communication based on, for example, the one or more received or determined security policies 408. In doing so, in block 508, the server 204 establishes cryptographic keys for VNF-VNF, VNFC-VNFC, and/or VNF-VNFC communication. Depending on the particular embodiment, any of the VNF-VNF, VNFC-VNFC, and/or VNF-VNFC communication may be unidirectional or bidirectional communication. For example, in some embodiments, VNF-VNFC communication may only occur in the sense that a particular VNF 202 can transmit information to a particular VNFC 214 (but not receive information from the VNFC 214) or a particular VNFC 214 can transmit information to a particular VNF 202 (but not receive information from the VNF 202), whereas in other embodiments the particular VNF 202 and VNFC 214 can bidirectionally communicate in the sense that both the VNF 202 and the VNFC 214 can transmit and receive information from one another. In some embodiments, the cryptographic keys may be established in the virtual switch 228 and/or a physical switch (e.g., in the NFVI 216) to protect incoming and outgoing traffic between the VNFs 202 and/or VNFCs 214 based on the security policies 408.

In block 510, the server 204 may establish one or more cryptographic keys as a function of a fuse key or other root of trust. That is, in some embodiments, one or more root/fuse keys may be established on the server 204 (e.g., in a fuse bank) by the OEM (or the entity that established the NFVI 216). In some embodiments, a root key is provisioned during the manufacturing of a particular hardware component(s) and is utilized to authorize the use of OEM keys. In other embodiments, the root keys may be derived from OEM-provisioned keys. Further, in some embodiments, the component(s) manufacturer and/or the OEM may delegate NFVI keys or other suitable cryptographic keys to be utilized as root keys.

In block 512, the server 204 may communicate with the trusted execution environment 220 (e.g., the TEE module 406) of one or more other servers 204 to establish cryptographic keys. For example, once the VNFs 202 and/or VNFCs 214 have been established on the server 204, the NFVI 216 of the server 204 may coordinate with corresponding NFVIs 216 of the other servers 204 to establish one or more cryptographic keys (e.g., session keys) for protecting the VNF/VNFC traffic. In some embodiments, session keys are derived from a mutual authentication protocol executed between the NFVIs 216, or more particularly, the corresponding TEEs 220, and root keys of the servers 204 may be used as shared secrets and/or authorized credentials depending on the particular embodiment. For example, in some embodiments, the TEEs 220 may use SSL, IPSec, and/or another web security protocol to establish cryptographic keys (e.g., session keys).

In block 514, the server 204 may establish different base keys and/or session keys for a variety of purposes depending on the particular embodiment. For example, in some embodiments, the server 204 may use the same or different derived keys for protecting control packets, management traffic, subscriber metadata, subscriber data, per-flow traffic, and/or other data. It should be appreciated that, in some embodiments, the server 204 may determine various base keys and derive session keys as a function of those base keys. In doing so, the server 204 may, for example, limit the exposure of the base keys and update the cryptographic keys utilizes for secure communication over time. However, in order to provide clarity to the description, both the base keys and session keys may be described herein simply as session keys.

It should be appreciated that, in some embodiments, each pair of communicative entities may have one or more unique cryptographic keys (e.g., session keys). For example, a first set of cryptographic keys may be established for secure VNF-VNF communication between a first and second VNF 202 and a second set of cryptographic keys may be established to secure VNF-VNF communication between the first VNF 202 and a third VNF 202. Further, as discussed above, in some embodiments, the cryptographic keys may be established for protection of VNF-VNF, VNFC-VNFC, and/or VNF-VNFC communication at a finer granularity. For example, in block 516, the server 204 may establish separate cryptographic keys for protecting different service flows (e.g., between the same entities). As such, one service flow requiring communication between a first pair of entities (e.g., VNFs 202) may be encrypted with a first cryptographic key, whereas a different service flow also requiring communication between those entities may be encrypted with a different cryptographic key. It should be appreciate that, in some embodiments, the security policies 408 identify the level of granularity and/or scope of data that the cryptographic keys are to protect. It should further be appreciated that the particular cryptographic algorithms utilized may be embodied as any suitable cryptographic algorithms for performing the functions described herein. For example, in some embodiments, the session keys are generated based on a symmetric cryptographic key algorithm, whereas in other embodiments, asymmetric cryptographic algorithm may be utilized. Further, in some embodiments, multiple cryptographic key algorithms may be utilized in conjunction with one another (e.g., a symmetric key for bulk encryption and an asymmetric key for encrypting the symmetric key or providing a cryptographic signature).

Figure 6:
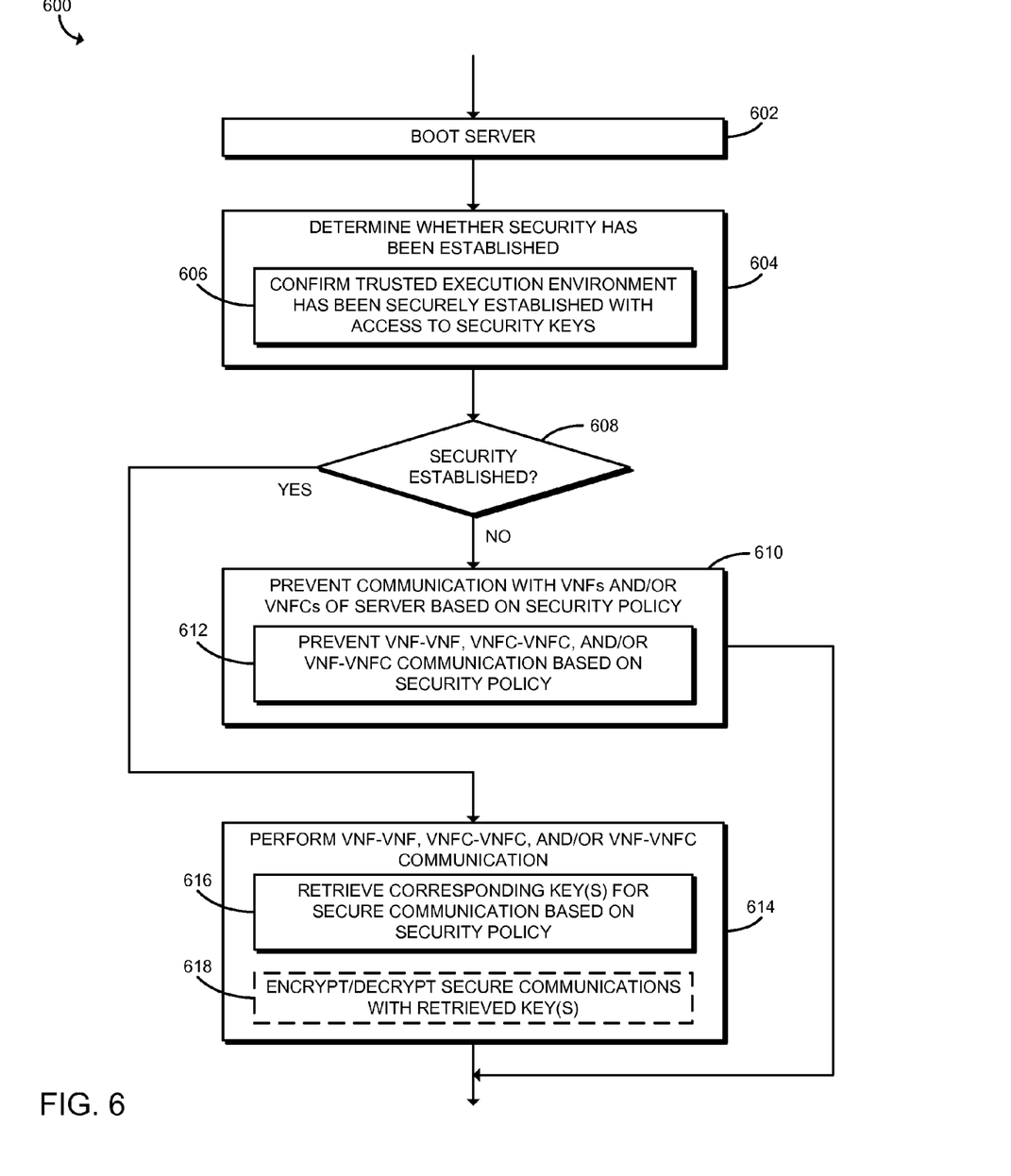
FIG. 6 is a simplified flow diagram of at least one embodiment of a method for secure inter-virtual network function communication that may be executed by the server of FIG. 3.

Referring now to FIG. 6, in use, the server 204 may execute a method 600 for secure inter-virtual network function communication or, more specifically, for secure VNF-VNF, VNFC-VNFC, and/or VNF-VNFC communication. It should be appreciated that, in some embodiments, the server 204 executes the method 600 with the NFVI module 402 (e.g., the NVFI 216). The illustrative method 600 begins with block 602 in which the server 204 is booted. In block 604, the server 204 determines whether security has been established on the server for secure inter-VNF and/or inter-VNFC communication. In doing so, in block 606, the server 204 may confirm that the TEE 220 of the server 204 has been securely established and has access to the relevant cryptographic security keys. For example, in some embodiments, the server 204 determines whether the TEE 220 has access to the cryptographic keys discussed above for secure VNF-VNF, VNFC-VNFC, and/or VNF-VNFC communication.

If the server 204 determines, in block 608, that security has not been established (e.g., the relevant cryptographic keys for secure communication are unavailable), the server 204 prevents communication with the VNFs 202 and/or VNFCs 214 of the server 204 depending on the requirements of the security policy 408. In doing so, in block 612, the server 204 may prevent VNF-VNF, VNFC-VNFC, and/or VNF-VNFC communication based on the security policy 408. As discussed above, the security policy 408 may permit such communication between entities within a particular server 204 in some embodiments due, for example, to some limited protection provided by the hypervisor 218. In other embodiments, the security policy 408 may prevent all communication (e.g., incoming and outgoing) with the VNFs 202 and/or VNFCs 214 of the server 204.

Returning to block 608, if the server 204 determines that security has been established, the server 204 performs the VNF-VNF, VNFC-VNFC, and/or VNF-VNFC communication as required by the corresponding service flows in block 614. In doing so, in block 616, the server 204 retrieves the corresponding cryptographic keys for secure communication based on the security policy 408 and, if the security policy 408 indicates that the corresponding communication should be encrypted, the server 204 encrypts/decrypts the secure communication with the retrieved keys in block 618. For example, if a particular VNF 202 must communicate information to another VNF 202 instantiated on a remote device, the VNF 202 may encrypt the information with the relevant cryptographic key (e.g., the session key corresponding with the two VNFs 202) and transmit the encrypted information to the other VNF 202 (e.g., via the virtual switch 228 and/or physical switch of the NFVI 216). Upon receipt, the remote VNF 202 retrieves the corresponding decryption key (e.g., a symmetric session key) and decrypts the packet(s). Similarly, a VNF 202 or VNF 214 communicating with another VNF 202 or VNF 214 within the same server 204 may encrypt data prior to transmission and decrypt the data upon receipt by the receiving entity.

In order to perform such secure VNF/VNFC communications, in some embodiments, the server 204 may perform packet identification for VNF/VNFC communications using, for example, IP addresses, TCP/UDP or higher level protocol port numbers, domain names, routing domain names, and/or packet identifiers communicated by the VNF manager 210 or orchestrator 208. Further, in some embodiments, the VNF/VNFC traffic is seamlessly protected by the NFVI 216 without making any changes to the particular VNFs 202 or VNFCs 214 running on the NFVI 216.

EXAMPLES

Illustrative examples of the technologies disclosed herein are provided below. An embodiment of the technologies may include any one or more, and any combination of, the examples described below.

Example 1 includes a computing device for secure inter-virtual network function communication, the computing device comprising a network function virtualization interface module to (i) determine a cryptographic key for secure communication over at least one of an inter-virtual network function (VNF) network, an inter-virtual network function component (VNFC) network, or a VNF-VNFC network based on a security policy of the computing device and (ii) communicate securely over the at least one of the inter-VNF, inter-VNFC, or VNF-VNFC network using the determined cryptographic key.

Example 2 includes the subject matter of Example 1, and wherein the network function virtualization interface module is further to establish the cryptographic key for the secure communication.

Example 3 includes the subject matter of any of Examples 1 and 2, and wherein to communicate securely over the at least one of the inter-VNF, inter-VNFC, or VNF-VNFC network comprises to communicate with a corresponding trusted execution environment module of a remote computing device.

Example 4 includes the subject matter of any of Examples 1-3, and wherein to establish the cryptographic key comprises to utilize at least one of a root of trust or a fuse key of the computing device.

Example 5 includes the subject matter of any of Examples 1-4, and wherein to establish the cryptographic key comprises to generate a base cryptographic key based on the at least one of the root of trust or the fuse key of the computing device; and generate a temporary cryptographic key based on the generated base cryptographic key for secure communication over at least one of the inter-VNF, inter-VNFC, or VNF-VNFC network.

Example 6 includes the subject matter of any of Examples 1-5, and wherein to establish the cryptographic key comprises to establish a first cryptographic key for communication between a first pair of entities selected from a set of VNFs and VNFCs of the computing device.

Example 7 includes the subject matter of any of Examples 1-6, and wherein the network function virtualization interface module is further to establish a second cryptographic key for communication between a second pair of entities, different from the first pair, selected from the set of VNFs and VNFCs of the computing device.

Example 8 includes the subject matter of any of Examples 1-7, and wherein to establish the first cryptographic key for the communication between the first pair of entities comprises to establish the first cryptographic key for communication between the first pair of entities associated with a first service flow; and wherein the trusted execution environment module is further to establish a second cryptographic key for communication between the first pair of entities associated with a second service flow different from the first service flow.

Example 9 includes the subject matter of any of Examples 1-8, and wherein to communicate securely over the at least one of the inter-VNF, inter-VNFC, or VNF-VNFC network comprises to communicate securely over an inter-VNF communication network.

Example 10 includes the subject matter of any of Examples 1-9, and wherein to communicate securely over the at least one of the inter-VNF, inter-VNFC, or VNF-VNFC network comprises to communicate securely over an inter-VNFC communication network.

Example 11 includes the subject matter of any of Examples 1-10, and wherein to communicate securely over the at least one of the inter-VNF, inter-VNFC, or VNF-VNFC network comprises to communicate securely over a VNF-VNFC communication network.

Example 12 includes the subject matter of any of Examples 1-11, and wherein the network function virtualization interface module is further to; determine whether the trusted execution environment module has access to the cryptographic key; and prevent communication over the at least one of the inter-VNF, inter-VNFC, or VNF-VNFC network based on the security policy in response to determining that the trusted execution environment module does not have access to the cryptographic key.

Example 13 includes the subject matter of any of Examples 1-12, and wherein to determine the trusted execution environment module of the computing device does not have access to the cryptographic key comprises to determine that the trusted execution environment module has not been securely booted.

Example 14 includes the subject matter of any of Examples 1-13, and wherein to determine the cryptographic key comprises to retrieve the cryptographic key based on the security policy; wherein the security policy defines corresponding cryptographic keys for secure communication between a plurality of pairs of entities selected from a set of VNFs and VNFCs of the computing device.

Example 15 includes a method for secure inter-virtual network function communication by a computing device, the method comprising determining, by the computing device, a cryptographic key for secure communication over at least one of an inter-virtual network function (VNF) network, an inter-virtual network function component (VNFC) network, or a VNF-VNFC network based on a security policy of the computing device; and communicating, by the computing device, securely over the at least one of the inter-VNF, inter-VNFC, or VNF-VNFC network using the determined cryptographic key.

Example 16 includes the subject matter of Example 15, and further including establishing, by the computing device, the cryptographic key for the secure communication.

Example 17 includes the subject matter of any of Examples 15 and 16, and wherein establishing the cryptographic key comprises establishing the cryptographic key with a network function virtualization interface module of the computing device; and wherein communicating securely over the at least one of the inter-VNF, inter-VNFC, or VNF-VNFC network comprises communicating by the network function virtualization interface of the computing device.

Example 18 includes the subject matter of any of Examples 15-17, and wherein communicating securely over the at least one of the inter-VNF, inter-VNFC, or VNF-VNFC network comprises communicating, by a trusted execution environment module, with a corresponding trusted execution environment module of a remote computing device.

Example 19 includes the subject matter of any of Examples 15-18, and wherein establishing the cryptographic key comprises utilizing at least one of a root of trust or a fuse key of the computing device.

Example 20 includes the subject matter of any of Examples 15-19, and wherein establishing the cryptographic key comprises generating a base cryptographic key based on the at least one of the root of trust or the fuse key of the computing device; and generating a temporary cryptographic key based on the generated base cryptographic key for secure communication over at least one of the inter-VNF, inter-VNFC, or VNF-VNFC network.

Example 21 includes the subject matter of any of Examples 15-20, and wherein establishing the cryptographic key comprises establishing a first cryptographic key for communication between a first pair of entities selected from a set of VNFs and VNFCs of the computing device.

Example 22 includes the subject matter of any of Examples 15-21, and further including establishing, by the computing device, a second cryptographic key for communication between a second pair of entities, different from the first pair, selected from the set of VNFs and VNFCs of the computing device.

Example 23 includes the subject matter of any of Examples 15-22, and wherein establishing the first cryptographic key for the communication between the first pair of entities comprises establishing the first cryptographic key for communication between the first pair of entities associated with a first service flow; and further comprising establishing, by the computing device, a second cryptographic key for communication between the first pair of entities associated with a second service flow different from the first service flow.

Example 24 includes the subject matter of any of Examples 15-23, and wherein communicating securely over the at least one of the inter-VNF, inter-VNFC, or VNF-VNFC network comprises communicating securely over an inter-VNF communication network.

Example 25 includes the subject matter of any of Examples 15-24, and wherein communicating securely over the at least one of the inter-VNF, inter-VNFC, or VNF-VNFC network comprises communicating securely over an inter-VNFC communication network.

Example 26 includes the subject matter of any of Examples 15-25, and wherein communicating securely over the at least one of the inter-VNF, inter-VNFC, or VNF-VNFC network comprises communicating securely over a VNF-VNFC communication network.

Example 27 includes the subject matter of any of Examples 15-26, and further including; determining, by the computing device, whether a network function virtualization interface module of the computing device has access to the cryptographic key; and preventing, by the computing device, communication over the at least one of the inter-VNF, inter-VNFC, or VNF-VNFC network based on the security policy in response to determining that the network function virtualization interface module does not have access to the cryptographic key.

Example 28 includes the subject matter of any of Examples 15-27, and wherein determining the network function virtualization interface of the computing device does not have access to the cryptographic key comprises determining that the network function virtualization interface module has not been securely booted.

Example 29 includes the subject matter of any of Examples 15-28, and wherein determining the cryptographic key comprises retrieving the cryptographic key based on the security policy; wherein the security policy defines corresponding cryptographic keys for secure communication between a plurality of pairs of entities selected from a set of VNFs and VNFCs of the computing device.

Example 30 includes a computing device comprising a processor; and a memory having stored therein a plurality of instructions that when executed by the processor cause the computing device to perform the method of any of Examples 15-29.

Example 31 includes one or more machine-readable storage media comprising a plurality of instructions stored thereon that, in response to execution by a computing device, cause the computing device to perform the method of any of Examples 15-29.

Example 32 includes a computing device for secure inter-virtual network function communication, the computing device comprising means for determining a cryptographic key for secure communication over at least one of an inter-virtual network function (VNF) network, an inter-virtual network function component (VNFC) network, or a VNF-VNFC network based on a security policy of the computing device; and means for communicating securely over the at least one of the inter-VNF, inter-VNFC, or VNF-VNFC network using the determined cryptographic key.

Example 33 includes the subject matter of Example 32, and further including means for establishing the cryptographic key for the secure communication.

Example 34 includes the subject matter of any of Examples 32 and 33, and wherein the means for establishing the cryptographic key comprises means for establishing the cryptographic key with a network function virtualization interface module of the computing device; and wherein the means for communicating securely over the at least one of the inter-VNF, inter-VNFC, or VNF-VNFC network comprises means for communicating by the network function virtualization interface of the computing device.

Example 35 includes the subject matter of any of Examples 32-34, and wherein the means for communicating securely over the at least one of the inter-VNF, inter-VNFC, or VNF-VNFC network comprises means for communicating, by a trusted execution environment module, with a corresponding trusted execution environment module of a remote computing device.

Example 36 includes the subject matter of any of Examples 32-35, and wherein the means for establishing the cryptographic key comprises means for utilizing at least one of a root of trust or a fuse key of the computing device.

Example 37 includes the subject matter of any of Examples 32-36, and wherein the means for establishing the cryptographic key comprises means for generating a base cryptographic key based on the at least one of the root of trust or the fuse key of the computing device; and means for generating a temporary cryptographic key based on the generated base cryptographic key for secure communication over at least one of the inter-VNF, inter-VNFC, or VNF-VNFC network.

Example 38 includes the subject matter of any of Examples 32-37, and wherein the means for establishing the cryptographic key comprises means for establishing a first cryptographic key for communication between a first pair of entities selected from a set of VNFs and VNFCs of the computing device.

Example 39 includes the subject matter of any of Examples 32-38, and further including means for establishing a second cryptographic key for communication between a second pair of entities, different from the first pair, selected from the set of VNFs and VNFCs of the computing device.

Example 40 includes the subject matter of any of Examples 32-39, and wherein the means for establishing the first cryptographic key for the communication between the first pair of entities comprises means for establishing the first cryptographic key for communication between the first pair of entities associated with a first service flow; and further comprising means for establishing a second cryptographic key for communication between the first pair of entities associated with a second service flow different from the first service flow.

Example 41 includes the subject matter of any of Examples 32-40, and wherein the means for communicating securely over the at least one of the inter-VNF, inter-VNFC, or VNF-VNFC network comprises means for communicating securely over an inter-VNF communication network.

Example 42 includes the subject matter of any of Examples 32-41, and wherein the means for communicating securely over the at least one of the inter-VNF, inter-VNFC, or VNF-VNFC network comprises means for communicating securely over an inter-VNFC communication network.

Example 43 includes the subject matter of any of Examples 32-42, and wherein the means for communicating securely over the at least one of the inter-VNF, inter-VNFC, or VNF-VNFC network comprises means for communicating securely over a VNF-VNFC communication network.

Example 44 includes the subject matter of any of Examples 32-43, and further including; means for determining whether a network function virtualization interface module of the computing device has access to the cryptographic key; and means for preventing communication over the at least one of the inter-VNF, inter-VNFC, or VNF-VNFC network based on the security policy in response to a determination that the network function virtualization interface module does not have access to the cryptographic key.

Example 45 includes the subject matter of any of Examples 32-44, and wherein the means for determining the network function virtualization interface of the computing device does not have access to the cryptographic key comprises means for determining that the network function virtualization interface module has not been securely booted.

Example 46 includes the subject matter of any of Examples 32-45, and wherein the means for determining the cryptographic key comprises means for retrieving the cryptographic key based on the security policy; wherein the security policy defines corresponding cryptographic keys for secure communication between a plurality of pairs of entities selected from a set of VNFs and VNFCs of the computing device.

The invention claimed is:

1. A computing device for secure inter-virtual network function communication, the computing device comprising:
   a processor;
   a memory; and
   a network function virtualization infrastructure module to:
   (i) determine whether security has been established on the computing device for secure communication over at least one of an inter-virtual network function (VNF) communication network, an inter-virtual network function component (VNFC) communication network, or a VNF-VNFC communication network;
   (ii) determine a cryptographic key for secure communication over the at least one of the inter-virtual network function (VNF) communication network, the inter-virtual network function component (VNFC) communication network, or the VNF-VNFC communication network based on a security policy of the computing device;
   (iii) receive a communication from at least one of a first VNF of the computing device or a first VNFC of the computing device to be communicated to at least one of a second VNF or a second VNFC;
   (iv) determine, based on the security policy, that the communication from the at least one of the first VNF or the first VNFC to the at least one of the second VNF or the second VNFC should be encrypted;
   (v) encrypt the communication with the cryptographic key in response to the determination that the communication should be encrypted;
   (vi) transmit the encrypted communication to the at least one of the second VNF or the second VNFC over the at least one of the inter-VNF, inter-VNFC, or VNF-VNFC network in response to a determination that the security has been established; and
   (vii) prevent communication over the at least one of the inter-VNF, inter-VNFC, or VNF-VNFC communication network based on the security policy in response to a determination that the security has not been established.

2. The computing device of claim 1, wherein the network function virtualization infrastructure module is further to establish the cryptographic key for the communication.

3. The computing device of claim 2, further comprising a trusted execution environment module, wherein to communicate securely over the at least one of the inter-VNF, inter-VNFC, or VNF-VNFC communication network comprises to communicate with a corresponding trusted execution environment module of a remote computing device.

4. The computing device of claim 2, wherein to establish the cryptographic key comprises to utilize at least one of a root of trust or a fuse key of the computing device.

5. The computing device of claim 4, wherein to establish the cryptographic key comprises to:
   generate a base cryptographic key based on the at least one of the root of trust or the fuse key of the computing device; and
   generate a temporary cryptographic key based on the generated base cryptographic key for secure communication over at least one of the inter-VNF, inter-VNFC, or VNF-VNFC communication network.

6. The computing device of claim 2, wherein to establish the cryptographic key comprises to establish a first cryptographic key for communication between a first pair of entities selected from a set of VNFs and VNFCs of the computing device.

7. The computing device of claim 6, wherein the network function virtualization infrastructure module is further to establish a second cryptographic key for communication between a second pair of entities, different from the first pair, selected from the set of VNFs and VNFCs of the computing device.

8. The computing device of claim 6, wherein to establish the first cryptographic key for the communication between the first pair of entities comprises to establish the first cryptographic key for communication between the first pair of entities associated with a first service flow; and
   wherein the network function virtualization infrastructure module is further to establish a second cryptographic key for communication between the first pair of entities associated with a second service flow different from the first service flow.

9. The computing device of claim 1, wherein to communicate securely over the at least one of the inter-VNF, inter-VNFC, or VNF-VNFC communication network comprises to communicate securely over an inter-VNF communication network.

10. The computing device of claim 1, wherein to communicate securely over the at least one of the inter-VNF, inter-VNFC, or VNF-VNFC communication network comprises to communicate securely over an inter-VNFC communication network.

11. The computing device of claim 1, wherein to communicate securely over the at least one of the inter-VNF, inter-VNFC, or VNF-VNFC communication network comprises to communicate securely over a VNF-VNFC communication network.

12. The computing device of claim 1 further comprising a trusted execution environment, wherein to determine whether security has been established on the server comprises to determine whether the trusted execution environment module has access to the cryptographic key; and
   wherein to prevent communication over the at least one of the inter-VNF, inter-VNFC, or VNF-VNFC communication network based on the security policy in response to a determination that the security has not been established comprises to prevent communication over the at least one of the inter-VNF, inter-VNFC, or VNF-VNFC communication network based on the security policy in response to determining that the trusted execution environment module does not have access to the cryptographic key.

13. The computing device of claim 12, wherein to determine the trusted execution environment module of the computing device does not have access to the cryptographic key comprises to determine that the trusted execution environment module has not been securely booted.

14. The computing device of claim 1, wherein to determine the cryptographic key comprises to retrieve the cryptographic key based on the security policy;
   wherein the security policy defines corresponding cryptographic keys for secure communication between a plurality of pairs of entities selected from a set of VNFs and VNFCs of the computing device.

15. One or more machine-readable storage media comprising a plurality of instructions stored thereon that, in response to execution by a computing device, cause the computing device to:
   determine whether security has been established on the computing device for secure communication over at least one of an inter-virtual network function (VNF) communication network, an inter-virtual network function component (VNFC) communication network, or a VNF-VNFC communication network determine a cryptographic key for secure communication over the at least one of the inter-virtual network function (VNF) communication network, the inter-virtual network function component (VNFC) communication network, or the VNF-VNFC communication network based on a security policy of the computing device;

receive a communication from at least one of a first VNF of the computing device or a first VNFC of the computing device to be communicated to at least one of a second VNF or a second VNFC;

determine, based on the security policy, that the communication from the at least one of the first VNF or the first VNFC to the at least one of the second VNF or the second VNFC should be encrypted;

encrypt the communication with the cryptographic key in response to the determination that the communication should be encrypted;

transmit the encrypted communication to the at least one of the second VNF or the second VNFC over the at least one of the inter-VNF, inter-VNFC, or VNF-VNFC network in response to a determination that the security has been established; and prevent communication over the at least one of the inter-VNF, inter-VNFC, or VNF-VNFC communication network based on the security policy in response to a determination that the security has not been established.

16. The one or more machine-readable storage media of claim 15, wherein the plurality of instructions further cause the computing device to establish, by a network function virtualization infrastructure module of the computing device, the cryptographic key for the secure communication; and
wherein to communicate securely over the at least one of the inter-VNF, inter-VNFC, or VNF-VNFC communication network comprises to communicate by the network function virtualization infrastructure of the computing device.

17. The one or more machine-readable storage media of claim 16, wherein to communicate securely over the at least one of the inter-VNF, inter-VNFC, or VNF-VNFC communication network comprises to communicate, by a trusted execution environment module, with a corresponding trusted execution environment module of a remote computing device.

18. The one or more machine-readable storage media of claim 16, wherein to establish the cryptographic key comprises to utilize at least one of a root of trust or a fuse key of the computing device.

19. The one or more machine-readable storage media of claim 18, wherein to establish the cryptographic key comprises to:
generate a base cryptographic key based on the at least one of the root of trust or the fuse key of the computing device; and
generate a temporary cryptographic key based on the generated base cryptographic key for secure communication over at least one of the inter-VNF, inter-VNFC, or VNF-VNFC communication network.

20. The one or more machine-readable storage media of claim 16, wherein to establish the cryptographic key comprises to establish a first cryptographic key for communication between a first pair of entities selected from a set of VNFs and VNFCs of the computing device.

21. The one or more machine-readable storage media of claim 20, wherein the plurality of instructions further cause the computing device to establish a second cryptographic key for communication between a second pair of entities, different from the first pair, selected from the set of VNFs and VNFCs of the computing device.

22. The one or more machine-readable storage media of claim 20, wherein to establish the first cryptographic key for the communication between the first pair of entities comprises to establish the first cryptographic key for communication between the first pair of entities associated with a first service flow; and
wherein the plurality of instructions further cause the computing device to establish a second cryptographic key for communication between the first pair of entities associated with a second service flow different from the first service flow.

23. The one or more machine-readable storage media of claim 15, wherein the plurality of instructions further cause the computing device to;
determine whether a network function virtualization infrastructure module of the computing device has access to the cryptographic key; and
prevent communication over the at least one of the inter-VNF, inter-VNFC, or VNF-VNFC communication network based on the security policy in response to a determination that the network function virtualization infrastructure module does not have access to the cryptographic key.

24. A method for secure inter-virtual network function communication by a computing device, the method comprising:
determining whether security has been established on the computing device for secure communication over at least one of an inter-virtual network function (VNF) communication network, an inter-virtual network function component (VNFC) communication network, or a VNF-VNFC communication network determining, by the computing device, a cryptographic key for secure communication over the at least one of the inter-virtual network function (VNF) communication network, the inter-virtual network function component (VNFC) communication network, or the VNF-VNFC communication network based on a security policy of the computing device;

receiving a communication from at least one of a first VNF of the computing device or a first VNFC of the computing device to be communicated to at least one of a second VNF or a second VNFC;

determining, based on the security policy, that the communication from the at least one of the first VNF or the first VNFC to the at least one of the second VNF or the second VNFC should be encrypted;

encrypting the communication with the cryptographic key in response to the determination that the communication should be encrypted;

transmitting the encrypted communication to the at least one of the second VNF or the second VNFC over the at least one of the inter-VNF, inter-VNFC, or VNF-VNFC network in response to a determination that the security has been established; and preventing communication over the at least one of the inter-VNF, inter-VNFC, or VNF-VNFC communication network based on the security policy in response to a determination that the security has not been established.

25. The method of claim 24, further comprising establishing, by a network function virtualization infrastructure module of the computing device, the cryptographic key for the secure communication; and wherein communicating securely over the at least one of the inter-VNF, inter-VNFC, or VNF-VNFC communication network comprises communicating by the network function virtualization infrastructure of the computing device.

\* \* \* \* \*